(12) United States Patent
Hamann et al.

(10) Patent No.: US 6,296,191 B1
(45) Date of Patent: Oct. 2, 2001

(54) STORING DATA OBJECTS IN A SMART CARD MEMORY

(75) Inventors: Ernst-Michael Hamann, Boeblingen; Michael Kaisser, Holzgerlingen, both of (DE)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/386,719

(22) Filed: Aug. 31, 1999

(30) Foreign Application Priority Data

Sep. 2, 1998 (DE) .............................................. 198 39 847

(51) Int. Cl.[7] .................................................. G06K 19/06
(52) U.S. Cl. .............................. 235/492; 235/487; 707/1; 707/9; 707/10
(58) Field of Search .................................. 235/492, 451, 235/487; 707/1, 9, 10, 2, 6, 7

(56) References Cited

U.S. PATENT DOCUMENTS

| | | | |
|---|---|---|---|
| 5,408,082 | * | 4/1995 | Takagi et al. .......................... 235/492 |
| 5,679,945 | * | 10/1997 | Renner et al. ........................ 235/492 |
| 5,692,178 | * | 11/1997 | Shaughnessy ............................ 707/8 |
| 5,950,201 | * | 9/1999 | Van Huben et al. ................... 707/10 |
| 6,005,942 | * | 12/1999 | Chan et al. ............................. 380/25 |
| 6,101,477 | * | 8/2000 | Hohle et al. .............................. 705/1 |
| 6,125,388 | * | 9/2000 | Reisman ................................. 709/218 |
| 6,168,078 | * | 1/2001 | Yanagi et al. ......................... 235/380 |
| 6,192,375 | * | 2/2001 | Gross .................................... 707/200 |
| 6,199,064 | * | 3/2001 | Schindler ................................. 707/7 |
| 6,216,204 | * | 4/2001 | Thiriet ................................. 711/115 |

FOREIGN PATENT DOCUMENTS

72000425 * 8/1995 (JP) .

* cited by examiner

*Primary Examiner*—Michael G. Lee
*Assistant Examiner*—Jamara A Franklin
(74) *Attorney, Agent, or Firm*—Louis P. Herzberg; Anne Vachon Dougherty

(57) ABSTRACT

The invention refers to a procedure for storing data objects 210, 220, 230, 240 in the memory 200 of a smart card 100. To do this, general and application-specific data objects are defined using freely selectable security characteristics and access rights, which are filed in the memory of a smart card which is divided into several application-specific memory areas 110, 120 so that data objects with identical access conditions are located in one and the same memory area, irrespective of the application program 310, 320, 330 or smart card user 400 to which these data objects are allocated. All application programs and the smart card user can access the data objects irrespective of the corresponding access conditions. In this way, the re-issuing of smart cards in the case of later expansion of the file structure of the smart card for an application or the addition of extra applications is not necessary. The smart card user can allow any applications to store data on his smart card.

27 Claims, 1 Drawing Sheet

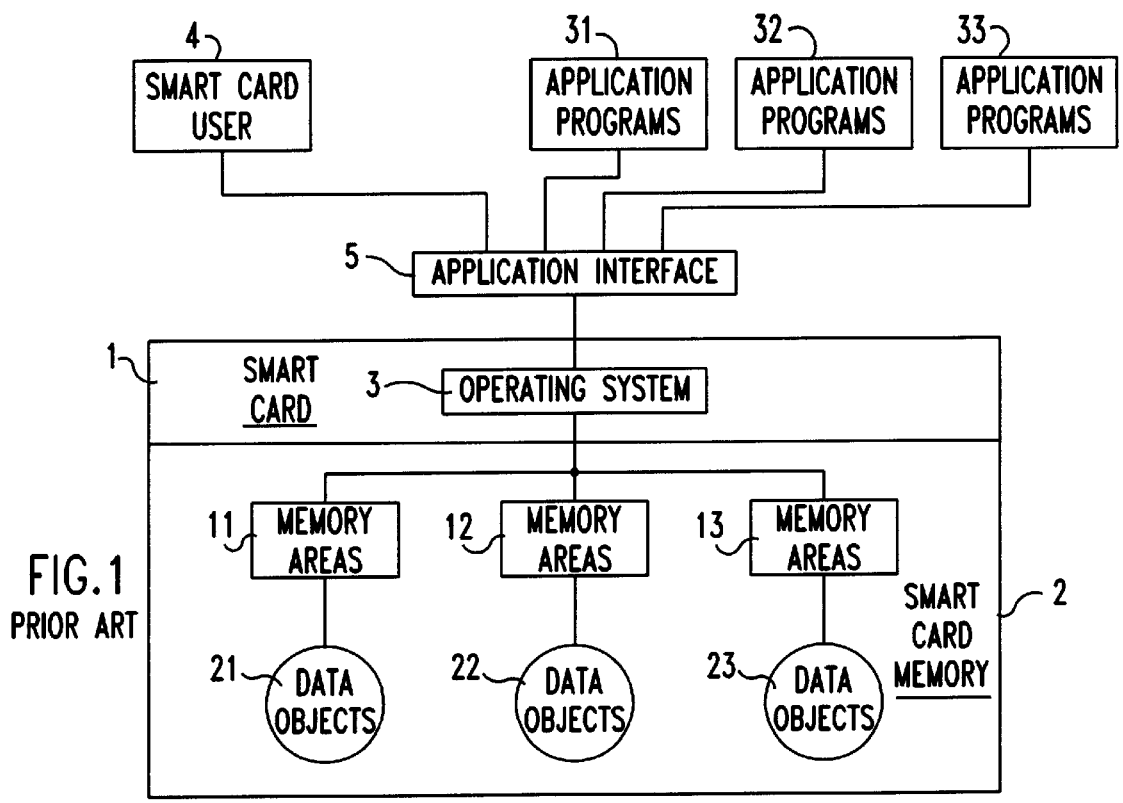
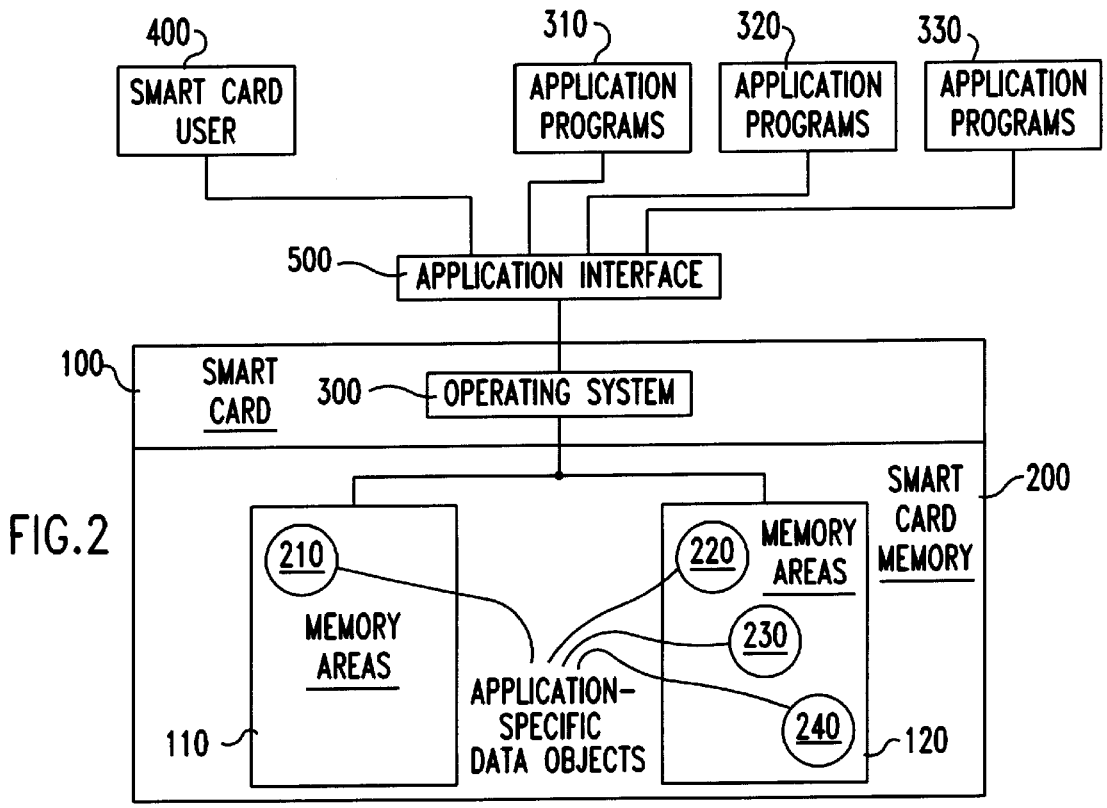

STORING DATA OBJECTS IN A SMART CARD MEMORY

The invention refers to a procedure for storing data objects in a smart card memory.

BACKGROUND OF THE INVENTION

Intelligent data carriers consisting of a microprocessor (chip) and memory units are already known. They are used, for example, as application-specific smart cards (bank cards, ID cards, etc.). File structures in accordance with the application programs are defined in the manufacture of the smart cards. It is therefore difficult to carry out additional applications and file structures at a later date. The smart card user can solely use the smart card for the applications stated at issuance of the card. The later expansion of file structures for an application or the addition of later applications often means that a smart card has to be reissued.

Application programs for these smart cards must be aware of the smart card to be used, as well as the file structures on them, in order to be able to use them. In addition, the applications must control the specific interfaces for the smart card readers and smart cards in order to be able to access the file structures of the smart card. An additional disadvantage can be found in the fact that each application has a prescribed place for storing data objects available to it, which place cannot be altered in size. This issuing of static memory limits the extent of data to be stored in an application and greatly restricts the flexibility of each application. In addition, up until now, two separate interfaces have had to be implemented for the use of simple data access, and for cryptographic procedures.

The cryptographic token interface standard (PKCS#11) of RSA Data Security Inc. sets out a general application interface standard for cryptographic units. This standard can also be applied to smart card readers and smart cards in order to address cryptographic characteristics of these components. In this, the management and use of objects such as symmetrical and asymmetrical codes and certificates for these codes are possible. The code objects can then be used for cryptographic procedures such as the marking, coding and decoding of data.

It is an object of the present invention to make available a procedure which removes the disadvantages of the current state of technology.

In particular, one object of the invention is to make available a procedure which allows application programs and smart card users to create, manage and use data objects on a smart card independent of the smart card operating system and the smart card readers used.

An additional object of the invention is to allow the smart card user to check the data structure of the smart card and to allow several applications to store data objects on its smart card.

Yet another object of the present invention is to allow the smart card user to equip data objects with any security characteristics and access conditions.

SUMMARY OF THE INVENTION

The foregoing and other objects are realized by the present invention comprising a procedure for storing data objects in the memory of a smart card. To do this, general and application-specific data objects are defined using freely selectable security characteristics and access rights and filed in the memory of a smart card, which is divided into several application-specific memory areas, so that data objects with identical access conditions are located in one and the same memory area, irrespective of the application program or smart card user to which these data objects are allocated. All application programs and the smart card user can access the data objects irrespective of the corresponding access conditions. In this way, the re-issuing of smart cards in the case of later expansion of the file structure of the smart card for an application or the addition of extra applications is not necessary. The smart card user can allow any applications to store data on his smart card.

These generic smart cards can be used for all applications selected by the smart card user. The user is also able to allow several applications to store data objects on his smart card. The issuing of a new smart card is not necessary in the case of an additional application being selected. The use of new applications is limited solely by the size of the memory available for data objects on the smart card. The memory available for a certain application is no longer set to a maximum size from the start. It is simply limited by the size of the overall memory of the smart card. The application operators are, therefore, saved the costs of issuing application-specific smart cards. The costs for setting up smart card-specific reading devices and application interfaces only occur once for all applications. An additional important advantage is that the data structure of the smart card can be controlled by the smart card user. In addition, data objects can be protected from improper use in whole or in part by passwords or cryptographic procedures. The security characteristics and access conditions of a data object can be set as required in the data object system both during the initialization of the smart card as well as by an application or by the smart card user. With the introduction of public coding procedures, such a smart card can also be used for identifying the smart card user for applications in public networks such as the Internet. The data objects can be filed in secure smart card data memories in mobile operation, for example in a network. This allows the smart card user to make mobile use of the data objects using with his identity established cryptographically using public codes and certification. In addition, only one common application interface is required for data access and for cryptographic procedures.

BRIEF DESCRIPTION OF THE DRAWINGS

The invention is described in the following with reference to the appended drawings wherein:

FIG. 1 is a simplified schematic view of the smart card including the application environment according to the current state of technology; and FIG. 2 is a simplified schematic view of the smart card including the application environment in accordance with the present invention.

DETAILED DESCRIPTION OF THE INVENTION

As shown in FIG. 1, the manufacturer of the smart card has, according to the state of current technology, already established memory areas 11, 12, 13 within the smart card memory during the definition and manufacture of the smart card, to which certain applications 31, 32, 33 are allocated. In these application-specific memory areas 11, 12, 13, application-specific data objects 21, 22, 23 are filed and protected in a respective application. In this, communication takes place over application interfaces 5. The procedures necessary for creating the file structures and the type and method of use of the file structures by the operating system 3 and the application programs 31, 32, 33, and thus the later use of the smart card by the smart card user 4, are already ascertained upon issuance of the smart card.

As shown in FIG. 2, the invention is designed to define any general and application-specific data objects 210, 220, 230, 240 of different types using freely selectable security characteristics and access conditions. These data objects 210, 220, 230, 240 of different types can be defined in any way, either when creating the smart card 100 or afterwards by the smart card user 400 or by application programs 310, 320, 330 over an application interface 500, and securely filed and modified in generally available memory areas 110, 120 on the smart card 100 without requiring an application-specific file structure on the smart card.

In defining the data object during or after the manufacture of the smart card, any data objects can be created, for example general or application-specific. In this, data objects can be standardized and equipped with data contents even during the manufacture of the smart card. In defining the data objects by the smart card user 400 after the manufacture of the smart card, freely selectable data objects can be created according to the requirements of the smart card user. Alternatively, the smart card user 400 can select defined data objects in the creation of the smart card and add data to them. In addition, after the smart card manufacture, individual applications 310, 320, 330 can create data objects or add data to data objects already created. These data objects can be accessed by the different applications or the smart card user over an application interface 500 according to its assigned access conditions. In this way it is irrelevant which sort of data objects are being accessed. For example, they can be data objects of the accessing application, another application, or general (i.e. non-application-specific) data objects. If the data objects are those with certain access conditions, such as private data objects of the smart card user, then access under the control of the smart card user is carried out using a password. Also, data objects can be defined which are equally available to several applications and the smart card user.

This concept results in an application-independent intelligent smart card with open file structures which can, however, be controlled by the smart card user. Examples of data objects on the present invention are data objects of the following types: Visitor cards (V-CARD) 210, lists of addresses in the Internet (BOOKMARK) 220, log-on dates of an application (LOGIN) 230, smart card user notes (NOTE) 240.

Preferably, an application interface 500 is adapted to the smart card 100 using the PKCS#11 standard for cryptographic units. It is advantageous that this standard also knows objects in the "data" class in addition to objects in the "code" and "certification" classes, whose structures are generally determined by cryptographic standards.

The PKCS#11 standard is thus expanded so that, in addition to the use of cryptographic procedures, it also allows the checking of general and application-specific data objects 210, 220, 230, 240 with freely selectable security characteristics and access rights for application programs 310, 320, 330.

The data to be stored in the data objects, and additional details such as the data type, security characteristics and access rights, are established by the application program or by the smart card user and transmitted to the application interface. From the data received by the application interface, data objects can be defined, for example, using the command "create_object" of the PKCS#11 standard. In this, the attributes "APPLICATION", "PRIVATE" and "VALUE" used in the PKCS#11 standard can be used. In the "APPLICATION" attribute, for example, the type of the data object and security characteristics which describe the type of data file in the "VALUE" attribute, can be established as encoded or marked. In the "PRIVATE" attributes, one or more access conditions such as password interrogation can be established. In this way, for example, it can be established whether it is a private, a public or a data object with another access condition. In the "VALUE" attribute, the data of the data object can be established. The file structure on the smart card is simplified by all data objects with identical access conditions being filed in one and the same memory area which is identified by this access condition. This occurs independently of the application, or by which smart card user the respective data object was created. An allocation of the smart card memory 200 to certain applications 310, 320, 330 is not carried out. The memory areas 110, 120 replace the memory areas previously required in which data objects of a certain application were combined.

Reading, writing, modification, sorting and deleting of data objects 210, 220, 230, 240 in the memory areas 110, 120 and additional use of data objects can be carried out using procedures known to the skilled person. If the data of a data object is structured in an established way, for example, according to a general usual standard which can be the case with the V-CARD data object, then these can be stored in a "Tag length value" structure. Variable lengths in data objects are thus facilitated in this way and the smart card memory 200 can be better used to capacity.

There is at least one, and preferably several of these memory areas 110, 120 whose number and size can be ascertained on initiating the smart card. In this, the memory areas have a preferred size of at least 1000 bytes, or more preferably 2000 bytes. In a particularly preferred embodiment, the sizes of the memory areas are at least 4000 bytes respectively.

During manufacture of the smart card, an access condition is allocated, or a combination of different access conditions are allocated, to each of these application-independent memory areas 110, 120. This can be, for example, a log-in procedure with password interrogation. If the memory areas are those which can be accessed without any conditions, then the access condition can also be "no condition". In a preferred embodiment, one of the application-independent memory areas 110 has the attribute "public" and another memory area 120 the attribute "private". In this way, all data objects filed in the pubic memory area 110, i.e. public data objects 210, can be accessed on logging on without the smart card user 400 being identified. During this time, all data objects which are filed in the private memory area 120, i.e. private data objects 220, 230, 240 cannot be accessed until a log-in procedure with a valid password has been carried out by the smart card user 400. As all data objects in a memory area are based on the same access conditions, the private memory area 120 and all the data objects 220, 230, 240 located in it are therefore protected in this case by a password. It would also be possible, for example, to have a memory area which can be written not by the smart card user but only by a security representative such as the smart card manufacturer.

The access conditions of the memory areas can be filed in separate areas of the smart card memory. They are checked and monitored by the smart card operating system and by the application interface. The individual applications have no influence here on the access conditions of individual memory areas. It would be possible for critical applications to file data objects in an additional application-independent memory area which has additional or other access conditions. Alternatively in this case, it would be possible to have, in addition to the application-independent memory areas 110, 120, the use of a normal memory area with regard to the application, into which all data objects of the critical application are exclusively combined.

In addition to the application-independent memory areas 110, 120, there are additional memory areas in which the serial number of the smart card, the codes and passwords are filed.

The present invention permits the use of a number of checks, some of which can be combined with one another. For example, data objects of a certain type can only be filed on the creation of the smart card, i.e. only filed when the smart card is personalized. One example is a verification code which can be used for checking the validity of the smart card in which a test question is marked by this code.

Additional data objects of a certain type may only be filed, amended or read after authentication in user-mode, i.e. after a log-in procedure with a valid user password. This applies particularly to the data objects of a private memory area.

In yet another implementation, additional data objects of a certain type may only be filed, amended or read after authentication in a security representative mode, i.e. after a log-in procedure with a valid security representative password. An example is a "license to call up an application" type.

Other data objects of a certain type may only be filed in a private data area. One example is the LOGIN type.

As another alternative, other data objects of a certain type can only be changed by applications with knowledge of a special access code. For other applications, these data objects can only be accessed in read mode. Data objects can be marked by the creator of the data object using a private code including the serial number of the smart card. The application which later uses the data object can then check using the public code of the creator and the serial number of the smart card to see whether the data object has the correct origin, has not been changed, and also has not been copied by another smart card. This allows the storing of a unique "ticket", e.g. an entry card or a medication prescription, on the smart card.

In addition, it is possible to encode the whole data object, or only particularly confidential parts of the data object, during creation. In this way, the confidentiality of the data object in transmission to and from the smart card by the application is ensured. One example is the LOGIN type in which the user password can be filed in encrypted form.

In a preferred embodiment of the present invention, certain data objects 210, 220, 230, 240 can trigger direct actions by means of suitable application programs 310, 320, 330 when selected using a graphic user interface, such as the starting of an application by the LOGIN type, starting an Internet browser using the BOOKMARK type or opening the address-book function using the V-CARD type.

In an additional preferred embodiment, instead of the data objects, program objects such as Java* Applets (trademark of Sun Microsystems) can be stored on the smart card. The present invention can be applied not only to smart cards but also to any intelligent data carrier.

Cryptographic co-processors with their own memory management (crypto-adapters), such as are found on a computer disk, can be used for example, instead of a smart card. Alternatively, crypto-adapters can also be used in a program form.

While the invention has been described with reference to preferred embodiments, it will be understood that modifications can be made without departing from the spirit and scope of the appended claims.

What is claimed is:

1. A method for storing data objects in a memory on a smart card, comprising the steps of:
   a) defining at least one data memory area in the memory of the smart card, where at least one allocated access condition is allocated to each data memory area;
   b) receiving data to be stored, said data being provided with at least one provided access condition;
   c) defining data objects from the data to be stored; and
   d) storing the data objects in one of the at least one data memory areas so that all data objects with identical provided access conditions are stored in one and the same data memory area having the corresponding allocated access condition, irrespective of the application program and smart card user to which the data object is allocated.

2. The method of claim 1 wherein said steps are carried out during the manufacture of the smart card.

3. The method of claim 1 wherein said receiving data, defining data objects, and storing are carried out by the smart card user over a user interface.

4. The method of claim 1 wherein said receiving data, defining data objects, and storing are carried out by an application program over an application interface.

5. The method of claim 1 wherein said defining objects comprises defining at least one of general and application-specific data objects.

6. The method of claim 1 wherein the data to be stored are provided with certain security characteristics.

7. The method of claim 6, wherein the data objects are protected by cryptographic procedures according to the security characteristics of the data to be stored.

8. The method of claim 6 wherein the access conditions and security characteristics of the data to be stored are established in a freely selectable way.

9. The method of claim 7 wherein the access conditions and security characteristics of the data to be stored are established in a freely selectable way.

10. The method of claim 1 wherein the access condition is the confirmation of a password.

11. The method of claim 3 wherein said defining objects comprises defining at least one of general and application-specific data objects.

12. The method of claim 3 wherein the data to be stored are provided with certain security characteristics.

13. The method of claim 12, wherein the data objects are protected by cryptographic procedures according to the security characteristics of the data to be stored.

14. The method of claim 12 wherein the access conditions and security characteristics of the data to be stored are established in a freely selectable way.

15. The method of claim 13 wherein the access conditions and security characteristics of the data to be stored are established in a freely selectable way.

16. The method of claim 3 wherein the access condition is the confirmation of a password.

17. The method of claim 4 wherein said defining objects comprises defining at least one of general and application-specific data objects.

18. The method of claim 4 wherein the data to be stored are provided with certain security characteristics.

19. The method of claim 18, wherein the data objects are protected by cryptographic procedures according to the security characteristics of the data to be stored.

20. The method of claim 18 wherein the access conditions and security characteristics of the data to be stored are established in a freely selectable way.

21. The method of claim 19 wherein the access conditions and security characteristics of the data to be stored are established in a freely selectable way.

22. The method of claim 4 wherein the access condition is the confirmation of a password.

23. A program storage device readable by machine, tangibly embodying a program of instructions executable by the machine to perform method steps for storing data objects in a memory on a smart card, said method steps comprising:
   a) defining at least one data memory area in the memory of the smart card, where at least one allocated access condition is allocated to each data memory area;
   b) receiving data to be stored, said data being provided with at least one provided access condition;
   c) defining data objects from the data to be stored; and
   d) storing the data objects in one of the at least one data memory areas so that all data objects with identical provided access conditions are stored in one and the same data memory area having the corresponding allocated access condition, irrespective of the application program and smart card user to which the data object is allocated.

24. A program storage device readable by machine, tangibly embodying a program of instructions executable by the machine to perform method steps for storing data objects in a memory on a smart card, said method steps comprising:
   a) receiving data to be stored, said data being provided with at least one provided access condition;
   b) defining data objects from the data to be stored; and
   c) storing the data objects in one of the at least one data memory areas so that all data objects with identical provided access conditions are stored in one and the same data memory area having the corresponding allocated access condition, irrespective of the application program and smart card user to which the data object is allocated.

25. An application interface for communication between a smart card and one of an application program and smart card user for storing data in memory on said smart card, wherein said storing comprises the steps of receiving data to be stored, said data being provided with at least one provided access condition; defining data objects from the data to be stored; and storing the data objects in one of the at least one data memory areas so that all data objects with identical provided access conditions are stored in one and the same data memory area having the corresponding allocated access condition, irrespective of the application program and smart card user to which the data object is allocated; said application interface characterised in that it is adapted for the use of cryptographic procedures and for the checking of general and application-specific data objects using freely selectable security characteristics and access conditions.

26. An improved smart card having a plurality of data memory areas, wherein the improvement comprises at least one access condition allocated to each data memory area.

27. The smart card of claim 26 wherein data objects are filed in the data memory areas independent of the application program allocated to it and independent of any smart card user.

* * * * *